(12) United States Patent
Adams et al.

(10) Patent No.: US 7,009,990 B1
(45) Date of Patent: Mar. 7, 2006

(54) METHODS AND SYSTEMS FOR A TELEPHONE E-MAIL INTERFACE

(75) Inventors: Rodney Glen Adams, Rowlett, TX (US); Albert Law, Plano, TX (US); Rita D'Ingianni, Richardson, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/065,787

(22) Filed: Apr. 23, 1998

(51) Int. Cl.
H04L 12/54 (2006.01)
(52) U.S. Cl. .................. 370/429; 370/352; 379/88.17
(58) Field of Classification Search ............... 370/217, 370/221, 352, 355, 357, 389, 392, 428, 912, 370/913, 395.4, 235, 353, 354, 356, 400, 370/401, 252, 429, 1; 379/67.1, 88.01, 88.11, 379/88.12, 88.16, 88.17, 88.22, 88.23, 217, 379/900, 93.17, 88.14, 52, 67; 709/217, 709/218, 227, 228, 229, 230, 231, 245, 246, 709/249; 455/412, 500, 461.1
See application file for complete search history.

(56) References Cited

U.S. PATENT DOCUMENTS

| 5,717,742 A * | 2/1998 | Hyde-Thomson ............. 379/88 |
| 5,742,905 A * | 4/1998 | Pepe et al. ................... 455/461 |
| 6,546,005 B1 * | 4/2003 | Berkley et al. .............. 370/353 |

OTHER PUBLICATIONS

Advertising materials from a website whose address is http://www.webley.com.

* cited by examiner

Primary Examiner—John Pezzlo
(74) Attorney, Agent, or Firm—Carr LLP

(57) ABSTRACT

Disclosed is a method of and apparatus for converting address and message input, obtained from a telephone type terminal, at a service provider, to a format whereby the service provider may attach the voice message to an e-mail directed to an internet addressee.

37 Claims, 2 Drawing Sheets

METHODS AND SYSTEMS FOR A TELEPHONE E-MAIL INTERFACE

TECHNICAL FIELD

The present invention relates in general to communicating a message to a given recipient and in particular to methods and systems for sending a message from a telephone to a recipient in a data network.

BACKGROUND

The Internet is a worldwide collection of computer networks connected to allow the transfer of information between entities connected to the individual networks. A popular form of information transfer is in the form of electronic mail typically referred to as "e-mail". E-mail usually comprises a short message typed on a computer terminal which is addressed to a recipient using letter type address. The Internet Service Provider (ISP) stores the message until it can be forwarded to a destination ISP serving the addressed recipient. The destination ISP holds the message in storage until the addressed recipient next requests reception of stored mail.

As is well known, e-mail may and usually does comprise only a straightforward typed message. However the message may be encrypted so that others cannot easily intercept and read the message. Further files may be attached to the e-mail message in the form of various software formats including word processing, spreadsheets and even voice and/or video recordings. Voice files would normally be in digital data network format. A common digital voice file format is a WAV file. Other digital audio formats are file formats such as AU, MIDI and AIF. Such a voice file can be compressed before transmission to reduce transmission time and storage space.

While a data network may be difficult to quantify, it is typically used for communications between computer type devices, transmits communications in digital format and usually uses packet transmission techniques as opposed to circuit techniques used in the Public Switching Telephone Network (PSTN).

Many times, however, an individual would like to send an e-mail message to an intended recipient but does not have immediate access to a computer connected to the internet. As there are typically telephones conveniently available in the form of business, home, coin operated pay phones and even cellular phones, it would be very convenient to be able to send messages to an addressee from a conveniently available telephone rather than having to find an available internet connected computer terminal.

It would be convenient to be able to contact a person by e-mail through the use of a standard telephone or mobile station. Such devices are typically more accessible as a means of sending a message than are networked computers. Further, the person wanting to send the message may only know the e-mail address of the intended recipient or realize that e-mail is the preferred means of contacting the recipient. There are also instances where the message to be delivered can only be conveniently delivered in voice form but the intended recipient cannot be conveniently contacted via a telephone.

SUMMARY OF THE INVENTION

The present invention comprises the method and apparatus for providing an automated interface to transfer a voice message from a calling party (CP) in a voice network to a recipient in a data network (e.g. the Internet).

BRIEF DESCRIPTION OF THE DRAWINGS

For a more complete understanding of the present invention, and its advantages, reference will now be made in the following Detailed Description to the accompanying drawings, in which.

DETAILED DESCRIPTION

Figure 1:
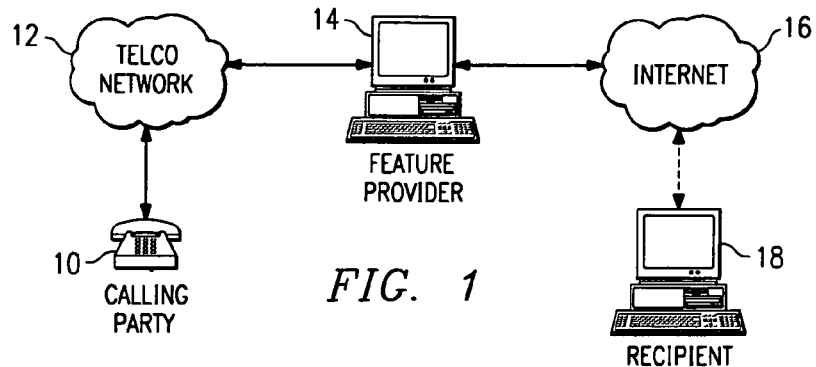
FIG. 1 is a block diagram of the interworkings of the components of the invention.

In FIG. 1, a calling party (CP) is shown using a telephone type instrument 10 to communicate through telephone lines and the telephone network, as shown by block 12, to a feature provider or telephone originated internet service provider 14. Once an address message is received by provider 14, a message is forwarded over an internet block 16 including an internet service provider (ISP) (not specifically shown) used by a recipient 18. The recipient may then contact the provider 14 to receive a voice message over the internet when the recipient's presently available e-mail terminal is capable of receiving the stored voice message.

The invention includes push technology such as web browsers where the message is received by the recipients terminal without any action upon the recipients part.

Figure 2:
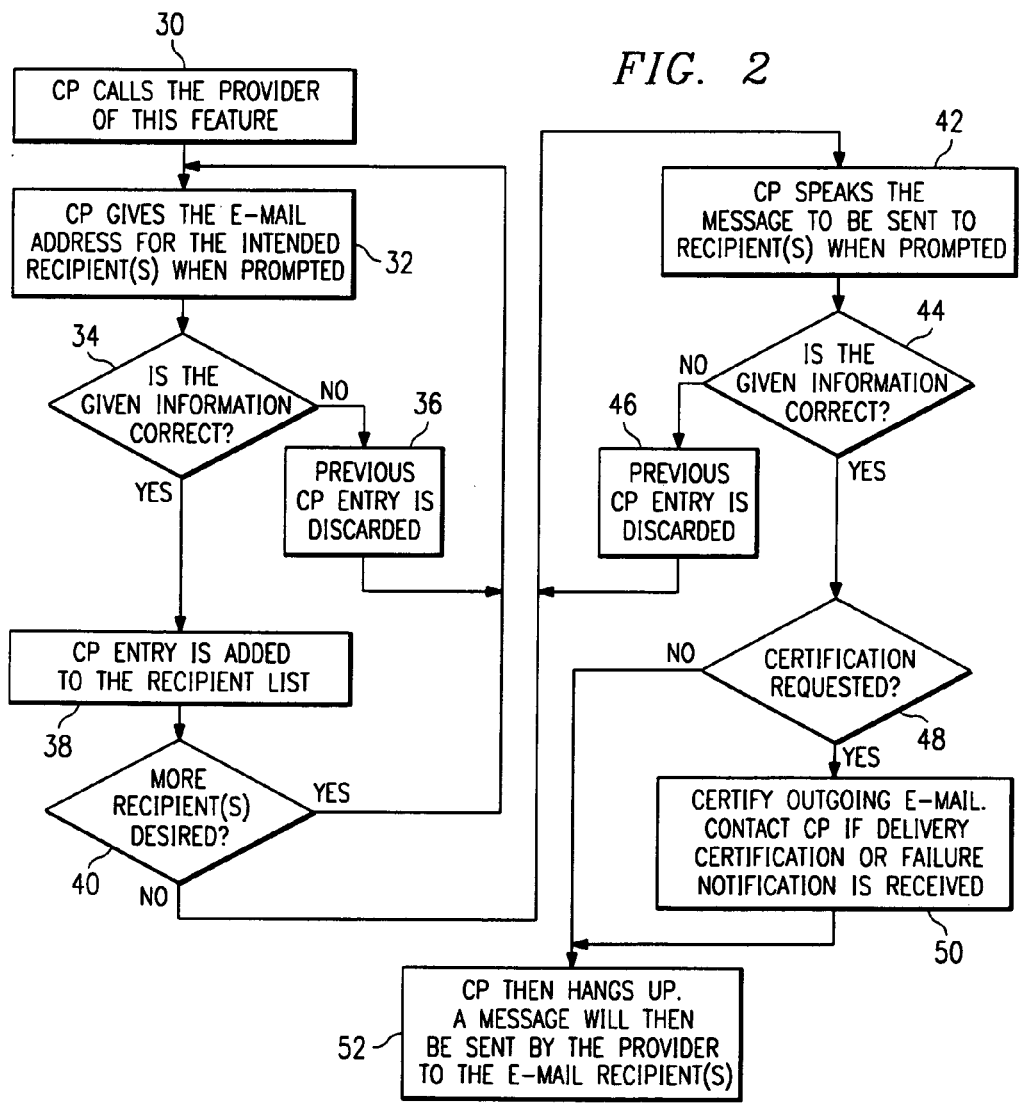
FIG. 2 is a flow diagram of how a message is addressed and formulated for sending by a originator within the telephone network.

As shown in FIG. 2, a calling party (CP) initiates the process by placing a call to a telephone e-mail provider as shown in a block 30. The CP gives the e-mail address for the intended recipient when prompted as set forth in a block 32. When the CP completes the address, a decision block 34 causes the feature provider 14 of FIG. 1 to have the CP review the address entered. If the CP determines that it is incorrect, the previously entered address is discarded as shown by a block 36 and the address is re-entered in block 32. When the address information entered is determined to be correct, the process proceeds to block 38 where the CP entry is added to a recipient list in provider 14. The process then proceeds to a decision block 40 where a determination is made as to whether or not more recipients of the e-mail are to be added to the list. If YES, the process returns to block 32 and if NO, it proceeds to a block 42. The CP now gives the message to be sent after prompting by the provider 14. When the message is completed, the CP is given a chance to review same for correctness in a decision block 44. If the message is determined to be incorrect or otherwise inappropriate, the CP entry is discarded in block 46 and the CP re-enters the message in block 42. When the message is determined to be correct, the system proceeds to a decision block 48 to ascertain if the CP wants certification of message delivery. If certification is requested, the process diverts to a certification block 50. Although not set forth specifically in this block, this step requires that the CP enter one of a destination telephone number for sending the certification message or a destination internet address for the certification message. Procedures and recognition circuitry in the provider 14 are readily available to recognize an answering machine or a fax machine at the destination telephone number and then act to provide an appropriate digital or voice message. The next step, in either case, is for the CP to hang up the telephone and for the provider 14 to send an e-mail message to the designated recipients as set forth in the final block 52 and further detailed in FIG. 3.

Voice recognition software is improving daily and may be used to provide any conversion necessary to convert voice address input to appropriate digital output for transmission over the internet. This conversion is particularly accurate when the data is entered letter by letter such as the word "alpha" to represent A, Bravo to represent B and so forth. When the software is trained to only the letters of the alphabet, the numerals 0 to 9 and a few characters such as ".", "1" and the like, it is more than 99% accurate for a majority of people. Thus one embodiment of the invention that would work with any telephone like terminal would use voice recognition software for the address. The determination of correctness of response by the provider 14 could be on a letter by letter basis as well as the entire address decision of block 34. The message itself may then either be recorded verbatim or converted to symbols as determined by the CP.

Addressing may also be accomplished by the use of touch tone keys at the CP's terminal such as block 10. An established prior art protocol may be used to enter an address. As an example, bob@bnr.ca might be entered as: 2-2 6-6-6 2-2*2-2 6-6 7-7**2-2-2 2 #. It may be noted that the 2 button on the telephone keypad additionally has the letters ABC imprinted thereon. Thus an "A" may be represented by one push of the '2' button and a "B" may be represented by two activations of the '2' button. A pause would need to occur between each entry character set. The "Q" and "Z" characters, not shown on the keypad, may be represented by activating the 7 and 9 buttons respectively four times. Alternatively, the 1 button may be used since it is further marked as the Q and Z button on some recent telephone keypads. The "1" may be entered by one push of the '*' button while the "." may be entered by two pushes of the '*' button. The '#' button may be used to signal the end of a given set of inputs.

Once the address is confirmed as being correct, a message to be supplied to the recipient(s) may be recorded as a voice file. The message is then converted into a format appropriate for the recipient and attached to a e-mail message sent to the recipient. As a service to recipients of this service, the provider 14 may offer downloadable software under given conditions which will enhance a recipients ability to access recorded voice files received from a sender.

The addressing of a recipient may also be accomplished through a variation of "speed dialing". The CP can arrange with the provider 14 that a given code such as *13 would be the address of a first given recipient while *14 would be the address of a second and different given recipient. The use of a "*" as a special designator is merely an example and other means may be used to differentiate speed dialing addresses from ordinary numeral or letter entry process of addressing a recipient.

When the provider 14 is given an internet address for the destination of a message, the forwarding of the message is taken care of by the internet block 16 in FIG. 1.

Figure 3:
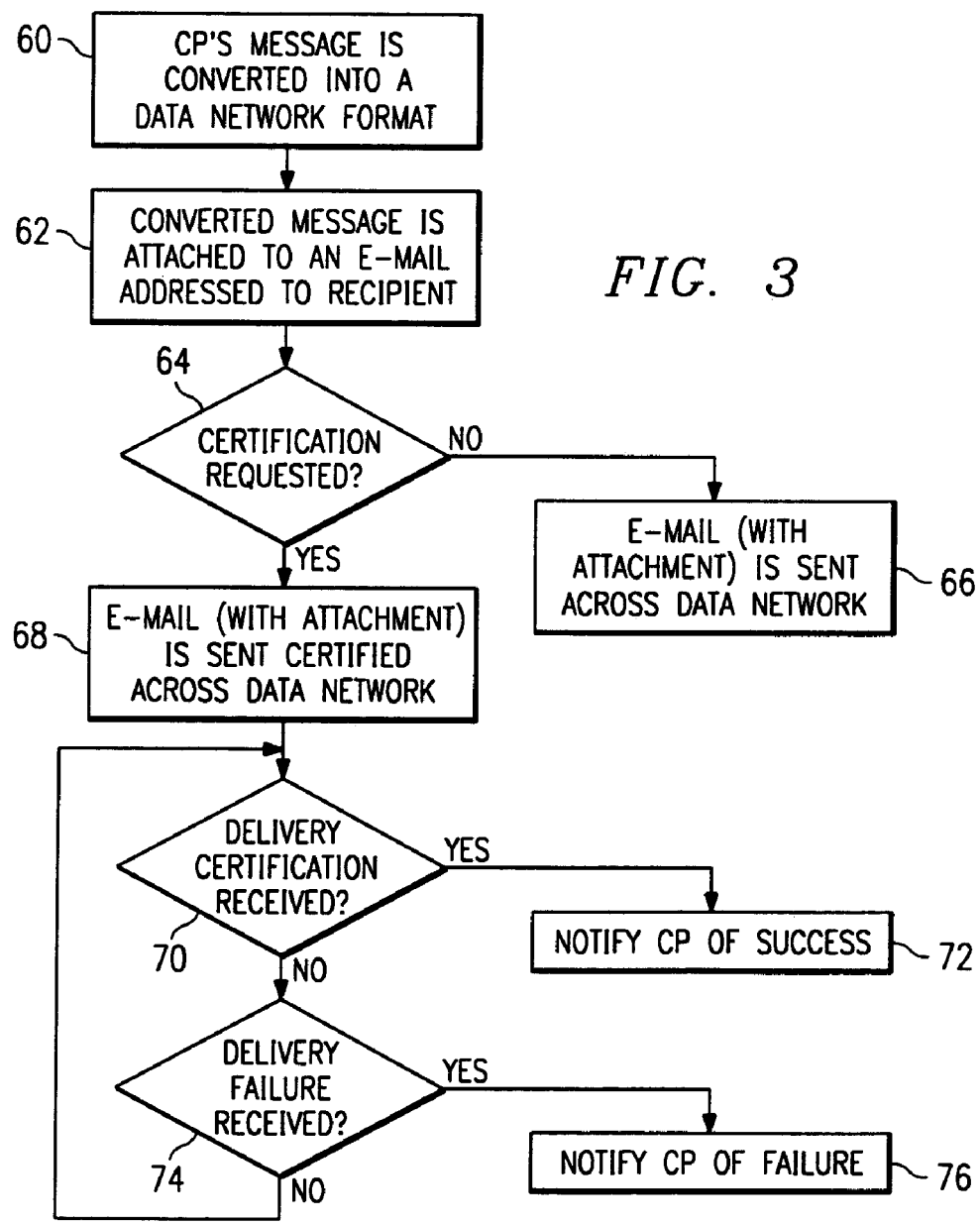
FIG. 3 is a flow diagram of the basic steps the telephone specific service provider needs to supply to practice this invention.

This process is shown in more detail in FIG. 3 where a block 60 represents an initial step of the service provider 14 in converting the CP or originator's voice message into an audio format suitable for transmission on a data network. As set forth in block 62, the provider 14 then creates an e-mail notification to the one or more recipients and attaches the converted voice message. A decision block 64 indicates the step of determining whether certification is requested. If it is not requested, the system proceeds to a block 66 where the e-mail is sent uncertified to the recipient. If, in block 64, it is determined that certification is requested, the system proceeds to block 68 where the e-mail is sent certified to the recipient. The system then proceeds to wait for responses from the Internet. In block 70, if the response is a notification that the recipient received the message, the system proceeds to block 72 and notifies the originator that the message was successfully delivered. If in block 70, it is determined that the response from the Internet is not a notification of certified delivery, then the system proceeds to decision block 74. In block 74 the Internet response is evaluated to determine if it is a message delivery failure notification. If it is, the system proceeds to block 76 and notifies the originator of the failure to deliver the message. If in decision block 74 it is determined that the response is not a message delivery failure notification, the system continues waiting for Internet responses at block 70.

In summary, the present invention comprises an automated interface to first accept a voice message from a CP or originator in a voice network (e.g. the Public Switching Telephone Network (PSTN)). It then converts the voice message into an appropriate audio format for transmission on the data network. Finally, the interface causes the transmission of an e-mail message with the voice message attached to a recipient in a data network (e.g. the Internet). In the prior art, the notification to the recipient has been separate from the delivery of the message. This invention utilizes more push technology to deliver the message with the notification.

In one embodiment of the invention, the inventive apparatus and method include storing the converted voice message for the recipient to retrieve later. Instead of the converted message itself being transmitted to the recipient, a message is transmitted to the recipient informing the recipient of the stored message. This transmitted message may be in the form of a page through a paging network or a short message service message through a cellular network.

In another alternate embodiment of the invention, the invention apparatus and method comprise both the steps of sending a notification message from the service provider to the recipient informing the recipient that a converted message has been transmitted in the form of electronic mail as well as actually sending the recipient the converted message in the form of electronic mail. The notification message is sent via a wireless communication network. For example, a communication network employing pagers may be used, wherein a page is sent to the recipient with a number or code which identifies that an e-mail message has been transmitted to the recipient. In another embodiment, a short message service message is transmitted to the recipient's cellular phone. One purpose for sending such a message is to notify the recipient to check e-mail for incoming messages.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It is therefore, contemplated that the claims will cover any such modifications or embodiments that fall within the true scope and spirit of the invention.

What is claimed is:

1. The method of automating the delivery of a voice originated message to a data network recipient comprising the steps of:

inputting a recipient e-mail address received from a calling party to be stored in a service provider;

supplying a voice originated message to be stored in the service provider wherein the email address and the voice originated message are input and supplied during a call;

converting a stored voice originated message to a data network format and sending a notification message from the service provider to the recipient informing the recipient of the stored voice originated message to be accessed via email.

2. The method of claim 1 wherein the notification message is sent through a wireless communication network.

3. The method of claim 2 wherein the notification message is sent in the form of a page.

4. The method of claim 2 wherein the notification message is sent in the form of a short message service message.

5. The method of claim 1 comprising the additional step of:

sending a converted voice originated message as electronic mail to the recipient.

6. The method of claim 5 comprising the additional step of sending the notification message from the service provider to the recipient of the electronic mail wherein the notification message informs the recipient that the recipient has been sent the converted voice originated message in the form of electronic mail.

7. The method of claim 6 wherein the notification message is sent through a wireless communication network.

8. The method of claim 7 wherein the notification message is sent in the form of a page.

9. The method of claim 7 wherein the notification message is sent in the form of a short message service message.

10. The method of claim 1 comprising the additional step of:

sending a converted voice originated message as an electronic mail attachment to the recipient.

11. The method of claim 1 comprising the additional step of:

confirming that the recipient's address is correct before supplying the voice originated message to be stored; and verifying the supplied voice originated message before sending the notification message to the recipient at said e-mail address.

12. Apparatus for automating the delivery of a voice network originated voice message to a data network recipient comprising:

service provider means including means for storing a data network recipient's e-mail address received from a calling party address and a voice network originated message for that recipient;

voice network means for inputting a recipient e-mail address to be stored in said service provider;

voice network means for supplying the voice network originated message to be stored in said service provider;

means for converting the supplied voice network originated message to a format appropriate for transmission over a data network and means for sending a converted voice network originated message from the service provider to the recipient informing the recipient of a stored converted voice network originated message to be accessed via email.

13. The apparatus of claim 12 comprising in addition:

means for sending the converted message as electronic mail to the recipient.

14. Apparatus as claimed in claim 12 wherein said means for inputting and means for supplying comprises telephone type communication means.

15. A system for automating a communication from a voice network to a data network comprising:

means for inputting a recipient email address received from a calling party to be stored in a service provider;

a calling party voice network terminal;

a service provider;

means for interconnecting said voice network terminal and said service provider;

means for converting inputs obtained from said calling party voice network terminal to a data network address;

means for converting a voice message received from said calling party voice network terminal to an audio format transmittable over a data network;

means for storing a converted voice message, means for forwarding said converted voice message to the stored data network address; and means for notifying a recipient at said stored data network address that the converted voice message is available for retrieval.

16. A method of delivering a voice originated message to a data network recipient comprising the steps of:

inputting a voice network originated recipient e-mail address received from a calling party to a service provider;

supplying a voice network originated message to the service provider;

converting the voice network originated message to a format suitable for transmission over a data network;

storing the recipient e-mail address;

storing a voice network originated converted message; and converting the supplied voice network originated message to an audio format.

17. Apparatus for delivering a voice originated message to a data network recipient comprising:

means for inputting a voice network originated recipient e-mail address received from a calling party to a service provider;

means for supplying a voice network originated message to the service provider;

means for converting a supplied voice network originated message to a format suitable for transmission over a data network and sending a notification message from the service provider to the recipient informing the recipient of a stored converted voice network originated message to be accessed via email.

18. Apparatus for storing and delivering a voice originated message to a data network recipient, comprising:

circuitry for receiving a recipient e-mail address from a calling party;

circuitry for receiving and converting a voice message to a data message having a data network format;

a store or storing the data message and recipient e-mail address;

circuitry for generating a notification message for notifying the recipient of the stored data format message; and transmission circuitry for transmitting the notification message to a wireless communication network.

19. The apparatus of claim 18 wherein the wireless communication network is comprised of a network for paging wherein the notification message is sent in the form of a page.

20. The apparatus of claim 18 wherein the wireless communication network comprises a mobile telephone network and wherein the notification message is sent in the form of a short message service message.

21. An apparatus for delivering a voice originated message to a data network recipient, comprising:
   circuitry for receiving a recipient e-mail address from a calling party;
   circuitry for receiving a voice message and for converting the voice message to a data network format;
   a store for storing the message in the data network format;
   means for transmitting the data network message over a data network to the recipient e-mail address; and
   means for transmitting a notification message to the recipient to inform the recipient that a data network message has been transmitted over the data network.

22. An apparatus for delivering a voice originated message to a data network recipient, comprising:
   means for receiving a voice message and recipient e-mail address from a calling party;
   means for storing the received message and recipient e-mail address;
   means for transmitting the message over a data network in a data network format to the recipient e-mail address; and
   means for transmitting a notification message to the recipient to inform the recipient that a data network message has been transmitted over the data network.

23. Apparatus for storing and delivering a voice originated message to a data network recipient comprising:
   means for receiving a voice message and recipient e-mail address from a calling party;
   means for storing the received message and recipient e-mail address;
   means for converting the received message to a data network format before forwarding same to the recipient;
   means for generating a notification message for notifying the recipient of the stored message; and
   means for transmitting the notification message to a wireless communication network.

24. The apparatus of claim 21 further including circuitry to cause the notification message to be transmitted simultaneously or nearly simultaneously to the transmission of the data network message over the data network.

25. Apparatus for automating the delivery of a voice network originated voice message from a sender to a data network recipient comprising:
   means for a calling party to input at least one recipient e-mail address to a service provider;
   data network means having at least one data network address from which text messages can be retrieved by a recipient of a notification message sent to the recipient address;
   storage means for storing information representing a data network address and information representing an associated voice network originated voice message for transmission to the data network address;
   voice network means for receiving and thereafter transmitting to the storage means information representing the data network address and the associated voice message,
   means for converting the information representing the voice message to a format appropriate for transmission over the data network means to the data network address; and
   wherein the data network means transmits the converted information representing the voice message to the data network address for retrieval by the message recipient.

26. The apparatus of claim 25, further comprising address conversion means for converting the information representing the data network address to a format appropriate for transmission over the data network means to the data network address.

27. The apparatus of claim 25, further comprising notification means for transmitting a signal to the data network recipient indicating receipt at the data network address of information representing the voice message.

28. The apparatus of claim 25, further comprising message display means for converting data representing the voice message received at the data network address into text for review by the recipient.

29. The apparatus of claim 25, further comprising certification means for transmitting to the voice message sender an indication of receipt at the data network address of the information representing the voice message.

30. The apparatus of claim 25, further providing means for verifying the accuracy of the data network address prior to transmission over the data network means of the information representing the voice message.

31. The apparatus of claim 26, wherein the data network address conversion means includes means for recognizing and converting voice representation of the data network address to digital data for transmission over the data network means.

32. The apparatus of claim 26, wherein the data network address conversion means includes means for recognizing touch tone entries representing the data network address.

33. The apparatus of claim 32, wherein the network data address is input to the voice network means by a touch tone code representing the address.

34. The apparatus of claim 25, wherein the message conversion means converts the voice message into a voice file appropriate for transmission to the data network address as an attachment to an e-mail message.

35. The apparatus of claim 32, wherein the notification means transmits a page to the data network recipient.

36. The apparatus of claim 27, wherein the notification means transmits the notification via a wireless communication network.

37. The apparatus of claim 25, wherein the data network means employs push technology means for allowing receipt of the voice message at the data network address without any action by the recipient.

* * * * *